United States Patent [19]
Sypitkowski

[11] 3,896,848
[45] July 29, 1975

[54] PRESSURE RESPONSIVE CHECK VALVE
[75] Inventor: James R. Sypitkowski, Clawson, Mich.
[73] Assignee: The Carborundum Company, Niagara Falls, N.Y.
[22] Filed: Mar. 25, 1974
[21] Appl. No.: 454,635

Related U.S. Application Data
[62] Division of Ser. No. 292,561, Sept. 27, 1972, Pat. No. 3,844,947.

[52] U.S. Cl. ............................ 137/512.15; 137/525
[51] Int. Cl. ............................................. F16k 15/14
[58] Field of Search............ 137/512.15, 525, 525.3, 137/525.5; 251/DIG. 2

[56] References Cited
UNITED STATES PATENTS

| 894,286 | 7/1908 | Reineking | 137/525.5 |
|---|---|---|---|
| 2,412,232 | 12/1946 | Sutton | 210/130 |
| 2,509,482 | 5/1950 | Crise | 137/525 X |
| 2,637,519 | 5/1953 | Ferrari | 137/525.5 |
| 2,731,154 | 1/1956 | Burnell | 137/525 X |
| 2,734,636 | 2/1956 | Foster | 210/130 |
| 2,918,941 | 12/1959 | Whiting | 137/512.15 X |
| 3,165,116 | 1/1965 | Rosenschold | 137/525 X |
| 3,417,777 | 12/1968 | Balsac et al | 137/525 |
| 3,543,935 | 12/1970 | Detrick | 210/130 |

FOREIGN PATENTS OR APPLICATIONS
1,221,444  1/1960  France ........................ 137/512.15

Primary Examiner—William R. Cline
Attorney, Agent, or Firm—David E. Dougherty; Robert C. Weber

[57] ABSTRACT

A pressure responsive check valve in which a coil of resilient strip material is positioned within a circular cup. External pressure, exerted against the outer surfaces of the resilient coil through openings in the side of the cup, cause the coil to contract and release the pressure into the valve interior through holes in the strip which come into alignment during the contraction. An alternate valve construction employs a similar coiled strip without holes, pressure being released through slots in the strip sealing surfaces when the coiled strip contracts under pressure. An improved spin on type filter cartridge is described in which this valve is used to allow fluid bypass during filter element stoppage.

6 Claims, 9 Drawing Figures

PATENTED JUL 29 1975 3,896,848

SHEET 2

PRESSURE RESPONSIVE CHECK VALVE

CROSS REFERENCE TO RELATED APPLICATIONS

This application is a division of copending application Ser. No. 292,561, filed Sept. 27, 1972 now U.S. Pat. No. 3,844,947.

BACKGROUND OF THE INVENTION

During the past several years the use of cartridge type filters has become standardized for many machine applications, especially in connection with the lubricating systems of internal combustion motors of various types. Since these motors require a constant circulation of oil through the working parts, any interruption of this flow can quickly lead to motor failure. The oil must be constantly filtered to remove particulate material formed during motor operation, such as carbon and metallic particles, and this is normally accomplished in a "full-flow" type of filter, one in which the full stream of circulating oil is filtered. Ordinarily, the filter cartridge will operate at high removal efficiency for a considerable period of time before it begins to plug up. Under normal operating conditions, filter cartridges are replaced periodically and oil filtration continues at high efficiency. There are circumstances, however, when unusual amounts of particles find their way into the circulating oil or a filter change may be overlooked. In these cases the filter element may become partly or completely plugged so that little oil can pass through. Since this would result in rapid motor failure, nearly all filter cartridges include a check valve of some sort which will open under pressure to permit at least part of the oil to by-pass the inoperative filter element. Since an uninterrupted flow of oil is essential to motor operation, the oil filter check valve must respond without delay to any filter stoppage. Various types of valve mechanisms have been employed for this purpose, most of them involving rather complicated assemblies. At the present time, many filter cartridges are those of the spin-on type which can be easily replaced and are discarded after use. Since these filter cartridges must be relatively inexpensive, their check valves must also be inexpensive to manufacture and easily assembled within the cartridge. Since these requirements have not been fully met with previous valve designs, the need therefore exists for a reliable pressure responsive check valve which can be easily constructed of inexpensive materials and readily assembled in filter cartridges of standard construction.

SUMMARY OF THE INVENTION

The invention pertains to a pressure responsive check valve comprising a circular cup having a side depending from a base, the side having one or more holes therein. A resilient strip is coiled within the cup with the edges of the strip positioned in sliding relationship with the inner surface of the cup and a support base, the surface of the strip is urged against the side of the cup. The strip is movable from sealing engagement with the side surface of the cup in response to fluid pressure exerted on the strip through the opening in the side of the cup. The strip may be made of metals such as spring steel or brass and may be coated with a polymeric material. The strip may contain at least two holes which come into alignment when the strip contracts, thereby releasing fluid pressure. An alternate construction employs a similar strip without holes, the pressure being released through a slotted support member when the strip contracts. Since the valve elements function by sliding contact, any particulate materials tend to be wiped away from the contact surfaces, thereby maintaining the reliability of valve action. The absence of separate springs, valve guides and seats reduces the number of parts to the minimum and provides an inexpensive valve which is easy to manufacture and assemble. In addition to these advantages, the compact size of the valve enables it to be used in standard filter cartridge assemblies with minimum design changes.

DESCRIPTION OF THE INVENTION

Figure 1:
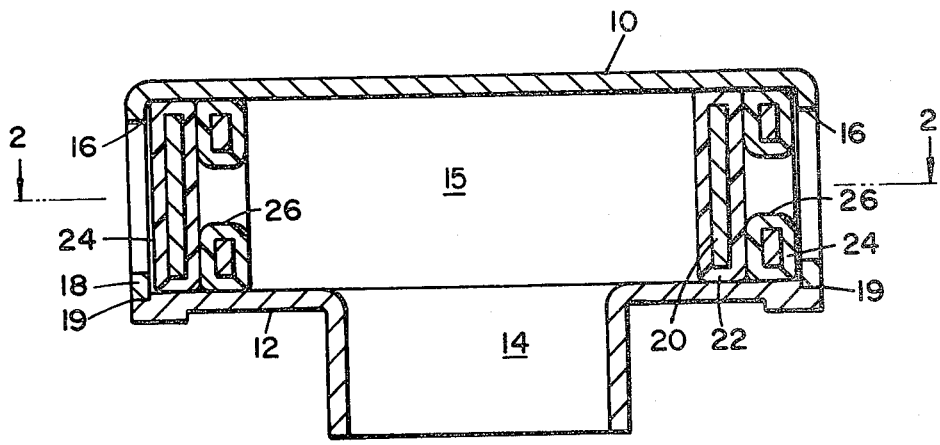
FIG. 1 shows a sectional side view of one form of the pressure responsive valve, the valve being in the closed position.

A sectional side view of one form of the pressure responsive check valve is shown in FIG. 1. The main body of the valve comprises a circular cup 10 which has an outlet 14. The cup has inlet openings 16 which are made around the sides 18 of the cup and provides a chamber 15 between the inlet openings 16 and the outlet 14. At least one opening is essential for the operation of the valve but two or more are preferred. The pressure responsive element of the valve is a continuous strip 20 of resilient material. This may be made of any material which is elastic and can be formed into an overlapping coil. Metals such as stainless steel, spring steel, spring brass or spring bronze are preferred for this purpose. The resilient strip 20 must contain at least two holes 26, but more than two are preferred. The strip 20 is then coiled to form at least two concentric loops and is inserted in the circular cup 10. The cup 10 is then attached to a matching support base 12 which holds the cup and provides a lower support for the resilient strip 20. The attachment of the cup side to the support base 12 may be either by a press fit or by soldering or spot welding at the line of attachment 19. The expansion of the resilient strip 20 urges the outer peripheral surfaces of the strip outwardly against the inner side of the cup, thereby resisting flow through the openings 16 from the high pressure area surrounding the valve into the relatively lower pressure existing inside the valve. The edges of the resilient strip must, of course, have a suitable sliding fit with the sides of the cup 10 and the sides of the support base 12 to enable the proper sealing action. Sliding friction may be reduced and sealing improved by coating the resilient strip, before coiling, with a polymeric material such as a polytetrafluoroethane, polyamide, polyester, polyvinyl or polyurethane. This is shown in FIG. 1 where the resilient strip is shown at 20 and the polymeric coating at 22.

Figure 2:
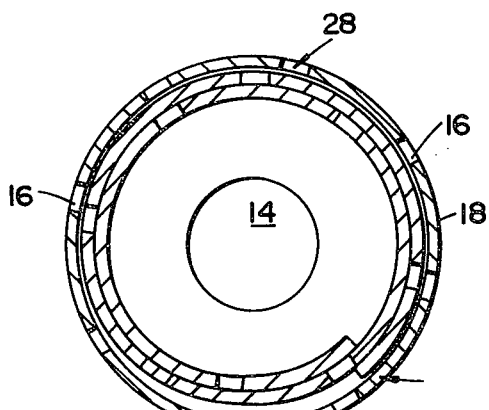
FIG. 2 shows a top view of the valve, sectioned along the center line 2—2 of FIG. 1.
Figure 4:
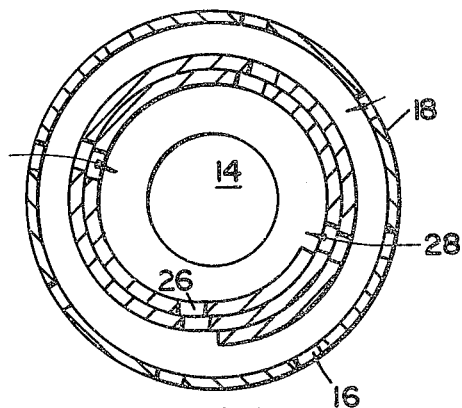
FIG. 4 shows a top view of the valve, sectioned along center line 4—4 of FIG. 3.
Figure 3:
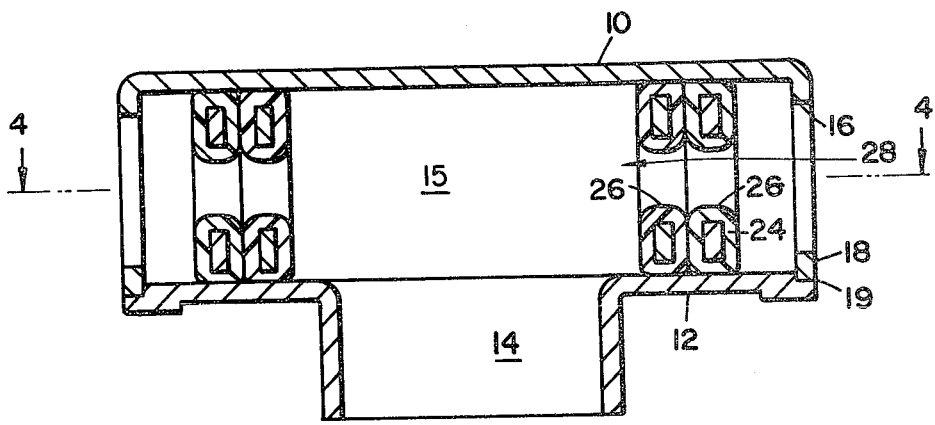
FIG. 3 shows a sectioned side view of the valve in the open position.

The holes 26 in the resilient strip are situated so as not to align when the strip 20 is coiled and the strip is pressing against the inner side of the cup. This is the closed position of the valve, as shown in FIG. 1 and FIG. 2. In this position, fluid pressure outside the valve acts against the outside diameter 24 of the coiled strip through the openings 16 in the sides 18 of the cup. As this external pressure increases, it begins to counteract the resistance of the coiled strip. The coil then tends to contract, the two loops of the coil sliding in respect to each other and reducing the diameter of the coiled strip. The holes in the inner loop of the strip thus move circumferentially in relation to those of the outer loop until they align, as shown in FIGS. 3 and 4. This is the open position of the valve wherein fluid may pass through the aligned holes 26 in the contracted strip coils as shown by arrows 28, thus equalizing external and internal pressures. The point of valve action may be controlled over a differential pressure range of 0 to 30 p.s.i. Any desired bypass pressure within this range can be attained by varying the number of holes in the coil, as well as by regulating the strip thickness and diameter.

Figure 5:
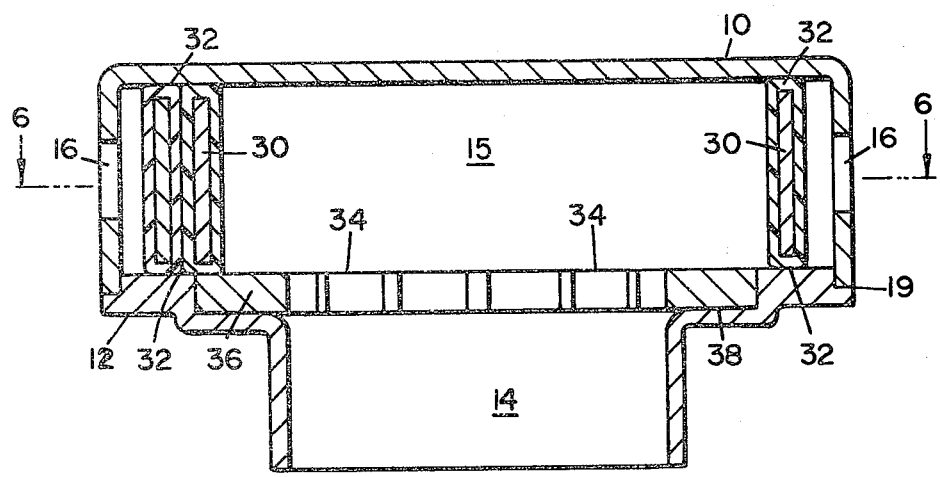
FIG. 5 shows a sectional side view of an alternate form of the pressure responsive valve, the valve being in the closed position.
Figure 6:
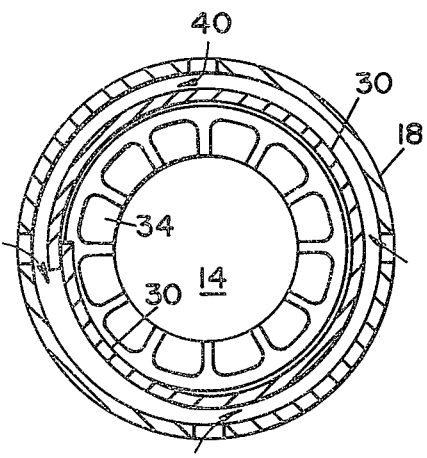
FIG. 6 shows a top view of the valve, sectioned along the line 6—6 of FIG. 5.
Figure 8:
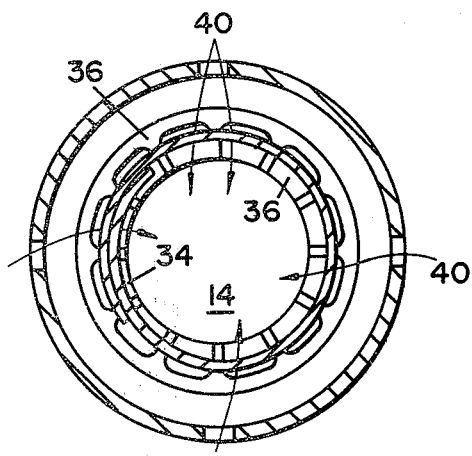
FIG. 8 shows a top view of the valve, sectioned along line 8—8 of FIG. 7.
Figure 7:
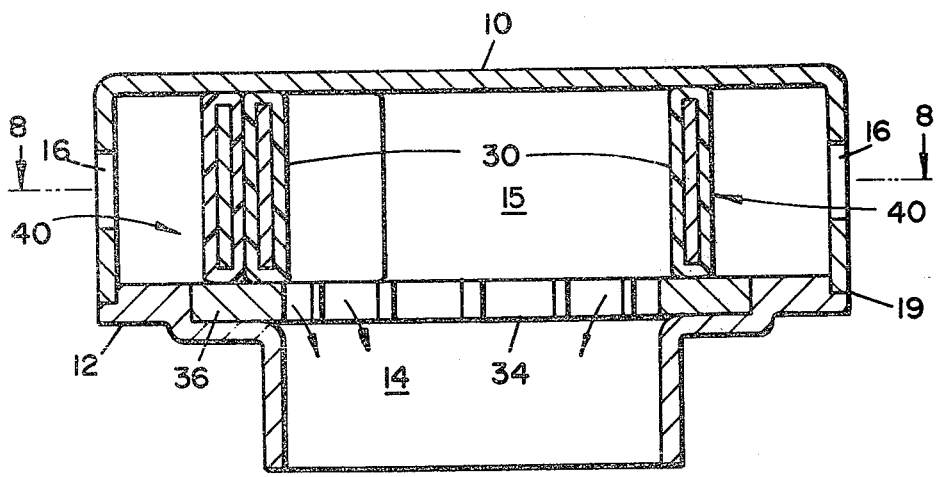
FIG. 7 shows a sectional side view of the valve in the open position.

An alternate configuration for the pressure responsive valve of the invention is shown in FIGS. 5 & 6. The main body of the valve again comprises a circular cup 10 attached to a matching support base 12, either by a press fit or by spot welds. A resilient strip 30 is coiled within the chamber 15 of the support cup. The edges of the coiled strip are in slideable relationship at the point 32 with the internal surfaces of the cup 10 and support base 12. The tension of the coiled strip resists external pressure exerted against it through the openings 16. The coiled strip may comprise resilient materials, as previously described, and may also be coated with a polymeric material also previously described, to reduce sliding friction and improve sealing. The valve is shown in the closed position in FIGS. 5 and 6. It should be noted that the strip 30 contains no holes. As the external pressure increases the coiled strip contracts to a smaller diameter thereby uncovering radial slots 34 in a circular support member 36. The circular support member fits in an annular recess 38 formed in the matching support base 12. The support member 36 supports the coiled strip 30 in proper working position when the valve opens, the external fluid pressure equalizing with the internal pressure at 14 through the slots 34. This action is shown in FIGS. 7 and 8 wherein the valve is open and fluid flow is shown by arrows 40.

Figure 9:
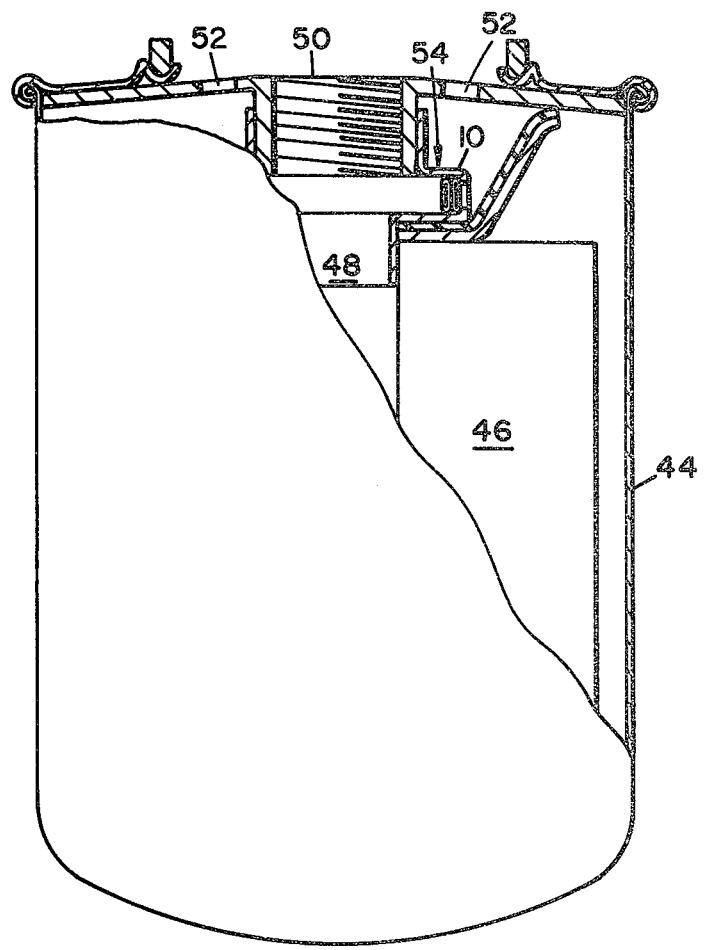
FIG. 9 shows a spin-on filter cartridge, partly in section, which incorporates the valve (as shown in FIGS. 5, 6, 7 and 8) of the invention.

The use of this valve as an improved component of a spin-on filter cartridge is shown in FIG. 9. This shows a view, partly in section, of a standard filter cartridge, improved over previous types by the use of the check valve 54 of the invention. The filter cartridge comprises a housing 44 containing a filter element 46 attached to a center tube 48 leading to outlet 50. Fluid under pressure enters the cartridge through inlets 52 and filtrate leaves at 50. These features are not a part of the invention and will not be described further except as necessary to illustrate the functioning of the check valve 54 of the invention. It should be noted that in this application, the circular cup 10 of the valve is made a part of the filter outlet 50 thus providing an unrestricted flow passage through the center of the resilient strip during normal operation of the filter. As filtration proceeds, the pressure differential between inlet 52 and outlet 50 will slowly increase until at a given point the valve 54 will open partially and permit a direct flow of unfiltered fluid from inlet 52 to outlet 50. This by-pass action may be pre-set by regulating the tension of the coil strip in the valve to respond to almost any degree of filter element plugging, either partial or complete.

While the valve 54, as shown in FIG. 9, may comprise a resilient strip coil having holes as shown in FIGS. 1–4, a valve using the alternate strip construction as shown in FIGS. 5–8 may also be used in the filter cartridge of FIG. 9 with equally effective results. Since the valve elements function by sliding contact, any particulate materials tend to be wiped away from the contact surfaces, thereby maintaining the reliability of valve action while the absence of separate springs, valve guides and seats reduces the number of parts to the minimum and provides an inexpensive valve which is easy to manufacture and assemble. In addition to these advantages, the compact size of the valve enables it to be used in standard filter cartridge assemblies with minimum design changes. No special materials, are required, the valve body or circular cup can be made from a thermoplastic, die casting, metal stamping or the like, the choice of material depending upon the fluid application. Most of the common elastomeric materials which may be used in the valve construction will permit filter operations at temperatures up to 300°F without adversely affecting the operation of the valve.

What is claimed is:

1. A fluid pressure responsive check valve wherein the improvement comprises: means forming a chamber having parallel inner surfaces connected by a side provided with one of an inlet and an outlet, the other of which communicates with one of said inner surfaces; and fluid pressure responsive sealing means disposed in said chamber and normally preventing fluid flow from said inlet to said outlet, said sealing means having sealing surfaces in sliding relationship with said inner surfaces and each other and being movable in response to fluid pressure exerted against said sealing means through said inlet to permit fluid flow to said outlet.

2. The valve of claim 1 wherein said side is provided with said inlet, and said sealing means comprises a resilient strip coiled upon itself with its outer peripheral surface urged toward said side and its edges in sliding relationship with said inner surfaces, said strip being contractible in response to said fluid pressure.

3. The valve of claim 2 wherein said resilient strip is provided with at least two through openings alignable upon contraction of the strip for allowing fluid flow through said openings.

4. The valve of claim 2 wherein said one inner surface is provided with at least one through slot communicating with said outlet and uncoverable upon contraction of said strip for allowing fluid flow through said slot.

5. The valve of claim 2 wherein said resilient strip is formed from a metal selected from the group consisting of stainless steel, spring steel, spring brass and spring bronze.

6. The valve of claim 2 wherein said resilient strip is coated with polymeric material selected from the group consisting of polytetrafluoroethane, polyamide, polyester, polyvinyl and polyurethane.

* * * * *